United States Patent
Humpston et al.

(10) Patent No.: US 6,732,905 B2
(45) Date of Patent: May 11, 2004

(54) VENTED CAVITY, HERMETIC SOLDER SEAL

(75) Inventors: Giles Humpston, San Jose, CA (US); Yoshikatsu Ichimura, Tokyo (JP); Nancy M. Mar, Mountain View, CA (US); Daniel J. Miller, San Francisco, CA (US); Michael J. Nystrom, San Jose, CA (US); Gary R. Trott, San Mateo, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 32 days.

(21) Appl. No.: 10/124,174

(22) Filed: Apr. 16, 2002

(65) Prior Publication Data

US 2003/0192942 A1 Oct. 16, 2003

(51) Int. Cl.[7] .......................... B23K 31/02; B23K 1/00; B32B 31/00
(52) U.S. Cl. ................. 228/124.6; 228/121; 228/122.1; 228/245; 156/87; 156/104
(58) Field of Search .............................. 228/121, 122.1, 228/124.6, 245–262; 156/87, 104

(56) References Cited

U.S. PATENT DOCUMENTS

| | | | | |
|---|---|---|---|---|
| 4,139,881 A | * | 2/1979 | Shimizu et al. | 361/760 |
| 4,413,766 A | * | 11/1983 | Webster | 228/122.1 |
| 4,650,107 A | * | 3/1987 | Keser | 228/123.1 |
| 4,934,426 A | | 6/1990 | Remond et al. | |
| 5,445,692 A | * | 8/1995 | Nitta | 156/87 |
| 5,807,626 A | * | 9/1998 | Naba | 428/210 |
| 6,195,478 B1 | | 2/2001 | Fouquet | |
| 6,324,316 B1 | | 11/2001 | Fouquet et al. | |

FOREIGN PATENT DOCUMENTS

| | | | |
|---|---|---|---|
| JP | 57043830 A | * | 3/1982 |
| JP | 63077730 A | * | 4/1988 |
| JP | 05259014 A | * | 10/1993 |
| JP | 9148481 | | 6/1997 |

OTHER PUBLICATIONS

Humpston, Giles and Jacobson, David M., "Principles of Soldering and Brazing", ASM International, Materials Park, Ohio, pp. 123–127 (Mar. 1993).

Koehler, Dale R. et al., "Ultraminiature Resonator Accelerometer" Sandia Report SAND96–0971, UC–700 (Apr. 1996).

* cited by examiner

Primary Examiner—Kiley Stoner
Assistant Examiner—Kevin McHenry

(57) ABSTRACT

Fluxless soldering processes use pressure variations and vented cavities within large-area solder joints to reduce void volumes and improve the properties of the large-area solder joints. The vents can be sealed after soldering if closed cavities are desired. A cavity can also improve hermeticity of a solder joint by providing an additional solder fillet around the cavity in addition to the solder fillet around the perimeter of the solder joint.

13 Claims, 2 Drawing Sheets

VENTED CAVITY, HERMETIC SOLDER SEAL

BACKGROUND

Soldering is an effective method for joining metallic components and can even join many non-metallic components provided that the faying surfaces are suitably metallized. Accordingly, many types of solders, soldering processes, and solder joint designs are known. Of the many types of solder joints, one of the most difficult to make is a large-area joint that provides a hermetic seal and is free of internal voids. In this context, a large-area solder joint is a solder joint covering an area having a smallest dimension more than 2 mm long.

Hermetic seals are difficult to form with large-area joints because the most reliable method of guaranteeing joint hermeticity is to ensure the formation of a continuous edge fillet around the entire perimeter of the joint. Meeting this requirement becomes progressively more difficult for joints having larger areas and perimeters.

Voids are a problem for a large-area solder joint because at dimensions greater than 2 mm, gas bubbles that are trapped between components or evolve internally on heating to the soldering temperature cannot overcome the hydrostatic pressure of the molten solder and escape via the edges of the joint. The bubbles thus remain trapped in the solder and form voids when the solder solidifies. FIG. 1 illustrates the dependence of the percentage of voids in a solder joint on the minimum joint dimension for some conventional solders. As can be readily seen from FIG. 1, the problem of voids in solder joints increases with the dimensions of the joints. These voids generally impair the electrical, thermal, and mechanical properties of a solder joint.

Making a large-area joint without flux further increases the difficulty of making void free joints. In general, a flux helps to remove surface oxides and thereby promotes wetting and spreading of molten solder. Without flux, making good quality solder joints is inherently more difficult, but avoiding the need for flux can simplify a soldering process. Accordingly, fluxless processes and technologies have been devised for making solder joints that are thin, large-area, and void-free. Some of these techniques include pre-applying solder, the "pressure variation" process, and applying compressive stress during the thermal cycle of the soldering. For best results, all three methods can be combined.

Pre-applying solder applies solder to the surface of one or both of the components being soldered, thereby decreasing the number of surfaces in the joint and hence sources of voids.

The pressure variation process reduces void levels in solder joints by compressing the trapped gas bubbles so that the gas bubbles and resulting voids occupy a much smaller fraction of the joint volume. The pressure variation process generally uses external gas pressure in a way that has many analogies with hot isostatic pressing. A typical pressure variation process involves placing the assembly of components to be soldered in a chamber at reduced pressure ($P_1$) and heating the assembly to the peak process temperature. The pressure in the enclosure is then increased several orders of magnitude to a higher pressure ($P_2$), and the assembly is allowed to cool under the high pressure $P_2$. To the extent that the bubbles behave as an ideal gas, an initial volume $V_1$ of voids at pressure $P_1$ decreases to a volume $V_2$ of voids at pressure $P_2$, where volumes $V_1$ and $V_2$ are related as indicated in Equation 1.

Equation 1:

$$V_2 = V_1 \cdot \left(\frac{P_1}{P_2}\right)$$

Equation 1 illustrates that the greater pressure $P_2$ is in relation to pressure $P_1$ the more effective the process is at reducing voids. Practical work has shown that a pressure ratio of 10:1 can typically achieve a void level of about 15%, and a ratio of 30:1 can reduce void levels to as low as 5%.

Difficulties arise with the pressure variation method when the solder joint is required to form a hermetic seal around a closed cavity. If the molten solder seals a closed cavity by wetting all of the joint surfaces, any variation in internal or external gas pressure can blow the solder off the joint line, thereby breaking the seal. Thus, the pressure variation process cannot be used with parts including solder seals around closed cavities.

In view of the limitations of known soldering techniques and solder joints, soldering processes and joints are sought that are able to provide thin, large area joining that is essentially void free and capable of hermetically sealing a cavity.

SUMMARY

In accordance with an aspect of the invention, a vented cavity is formed between surfaces of components being joined with a large-area solder joint. The cavity reduces the distance that gas bubbles in molten solder must travel to escape during formation of the large area solder joint. Accordingly, fewer gas bubbles are trapped, resulting in fewer voids in the solder joint. Additionally, since the cavity is vented, a pressure variation process can be applied during soldering to improve the fill and hermeticity of the solder joint. The vent can be sealed after forming the solder joint to hermetically seal the cavity, if desired.

The vented cavity with or without the pressure variation process can be applied not only to solder joints but also to joints formed using a braze or an adhesive.

One embodiment of the invention is a process for attaching components. The process begins by forming an assembly including a first component and a second component with a joining material such as a solder, a braze, or an adhesive sandwiched between the first and second components. The first and second components form a vented cavity that the joining material surrounds. Heating the assembly activates or melts the joining material and gas bubbles in the joining material during heating can escape from the joining material via the cavity and the vent to the surroundings of the assembly. Sealing the vent after the joining material solidifies can hermetically seal the cavity.

After heating of the assembly, pressure surrounding the assembly can be increased to compress gas bubbles that may still remain trapped in the joining material. The increased pressure is maintained while cooling the assembly to solidify the joining material, so that any voids corresponding to the gas bubbles are smaller than they would be in a process that did not increase the pressure. Since the cavity is vented, pressure inside the cavity is same as the pressure outside the assembly and the increased pressure does not disturb hermeticity of the seal.

Another embodiment of the invention is a joined structure including first and second components made of materials such as a metal (e.g., molybdenum), a semiconductor (e.g., silicon), a glass, or a ceramic with a joining material such as a solder, a braze, or an adhesive sandwiched between the first and second components. The first and second components form a cavity that the joining material surrounds, and a vent leads away from the cavity. The vent can be sealed after the first and second components are joined so that the joining material and the vent together hermetically seal the cavity. The joint structure can further include a series components and solder joints forming a series of vented cavities that share a common vent, and/or a set of components that have individually vented cavities.

BRIEF DESCRIPTION OF THE DRAWINGS

Use of the same reference symbols in different figures indicates similar or identical items.

DETAILED DESCRIPTION

In accordance with an aspect of the invention, one or more vented cavities can be provided within the area of a large-area solder joint to improve the release of gas bubbles and reduce the volume of voids in the solder joint. The pressure variation process for solder can further reduce the volume of voids in the solder joint without disturbing the seal that the solder forms. Use of the pressure variation process in this manner is counter-intuitive in that the solder joint deliberately includes cavities, the very feature that normally precludes application of the pressure variation process.

In accordance with another aspect of the invention, a cavity to be hermetically sealed by a solder joint is provided with a vent to permit a pressure variation process that reduces voids in the solder joint. After the solder joint is complete, the vent can be sealed to create a closed cavity.

In accordance with yet another aspect of the invention, providing a cavity at the location of aligned vent holes in components being soldered substantially improves yield of hermetic joints through modification of the peripheral fillet, which is now also at an interior perimeter of the cavity in addition to the exterior perimeter of the joint.

Figure 1:
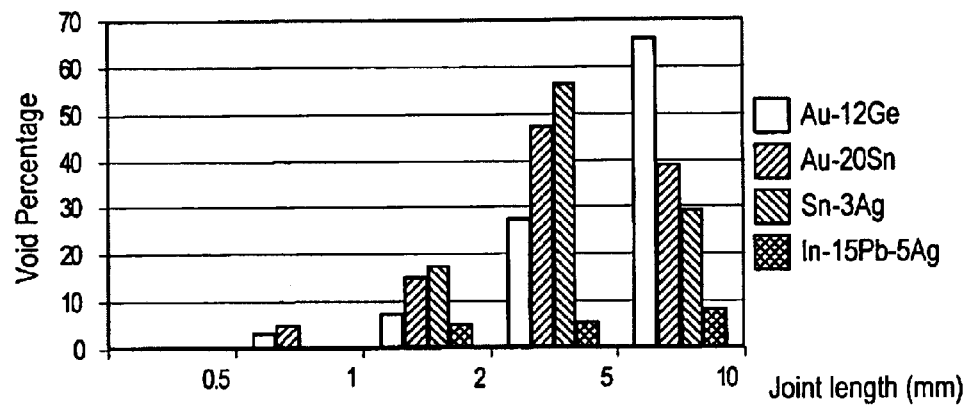
FIG. 1 is a bar graph illustrating the effect that the size of a conventional solder joint has on the percentage volume of voids in the solder joint.
Figure 2A:
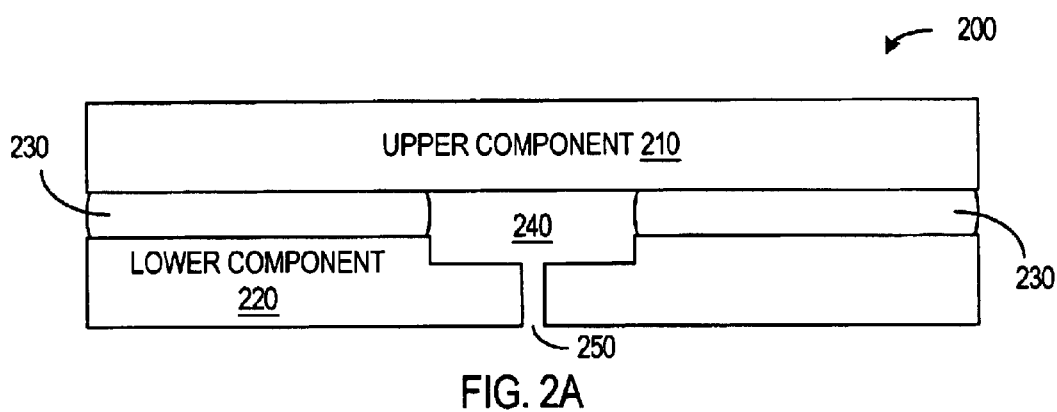
FIGS. 2A and 2B are cross-sectional views of solder joints including vented cavities in accordance with embodiments of the invention.

FIG. 2A illustrates a cross-section of an assembly 200 in accordance with an embodiment of the invention. Assembly 200 includes an upper component 210 that is joined to a lower component 220 by a solder joint 230. Components 210 and 220 can be made of any material suitable for soldering. For example, either component 210 or 220 can be made of a metal, a semiconductor, a glass, or a ceramic having a planar surface to which a solder will adhere. Generally, if component 210 or 230 is a semiconductor, a glass, or a ceramic, the surface of the component must be coated with a metal, which can be accomplished using a conventional technique such as electroplating, vapor deposition, or sputtering.

Figure 2B:
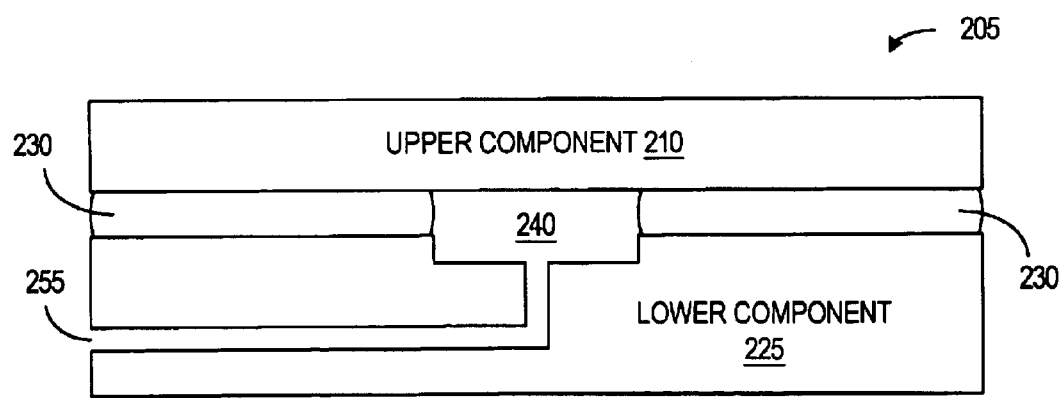

In assembly 200, a cavity 240, which is between components 210 and 220 and ringed by solder joint 230, results from one component 220 including a depression in an otherwise planar surface. Cavity 240 has a vent or outlet 250 that provides fluid communications between cavity 240 and the surroundings of assembly 200. As an example of one vent system, FIG. 2A shows a configuration where vent 250 includes a hole passing from cavity 240, through lower component 220, to an opening at the bottom of lower component 220. FIG. 2B shows an alternative assembly 205 in which a vent 255 passes from cavity 240, through a lower component 225, to an opening on a side of lower component 225. As will be understood, many other alternative vented cavity systems can be fabricated in components 210 and 220 and serve the same functions as vents 250 and 255.

A process for fabricating assembly 200 can begin with fabrication of components 210 and 220. Each component 210 or 220 has a bonding surface (typically a planar surface) that matches a bonding surface of the other component and is metal or metallized. Solder 230 can be pre-applied to the bonding surface of component 210 or 220, or both. Equally, solder 230 could be a freestanding solder perform that is inserted between components 210 and 220. One or both of components 210 and 220 are further shaped so that placing the bonding surfaces of components 210 and 220 in contact leaves cavity 240 between the components and provides a vent 250 or 255 from cavity 240 to the surroundings. Components 210 and 220 can be placed together with or without a flux between them.

The assembly 200 or 205 is then place in a chamber that has facilities to change the internal temperature and pressure in a controlled manner. The chamber then is evacuated to provide a low pressure (e.g., about 10 mPa) surrounding the assembly. While the chamber pressure is low, the assembly is heated to a peak temperature (e.g., the soldering temperature). When the assembly is at the peak temperature, pressure in the chamber is raised to a high pressure (e.g., 200 kPa), while assembly 200 or 205 is allowed to cool and solder 230 solidifies.

Employing a vented cavity in soldered structures such as illustrated in FIGS. 2A and 2B provides for several benefits: The vented cavity reduces the breadth of solder joint 230, which minimizes the tendency for voids to form in solder joint 230. The reduction in joint breadth also means that a pressure variation process is more effective at reducing the volume of voids in solder joint 230 because the effect of the hydrostatic pressure of the solder is decreased. Furthermore, the probability that solder joint 230 provides a hermetic seal is greatly increased because a second, internal fillet forms around the short joint periphery of cavity 240.

After joining components 210 and 220 or 210 and 225 to form assembly 200 or 205, cavity 240 can be filled or evacuated via vent 250 or 255, and then vent 250 or 255 can be sealed to provide a hermetically sealed structure. A variety of known methods such as welding, crimping and mechanically plugging are known and suitable for sealing a vent.

Figure 3A:
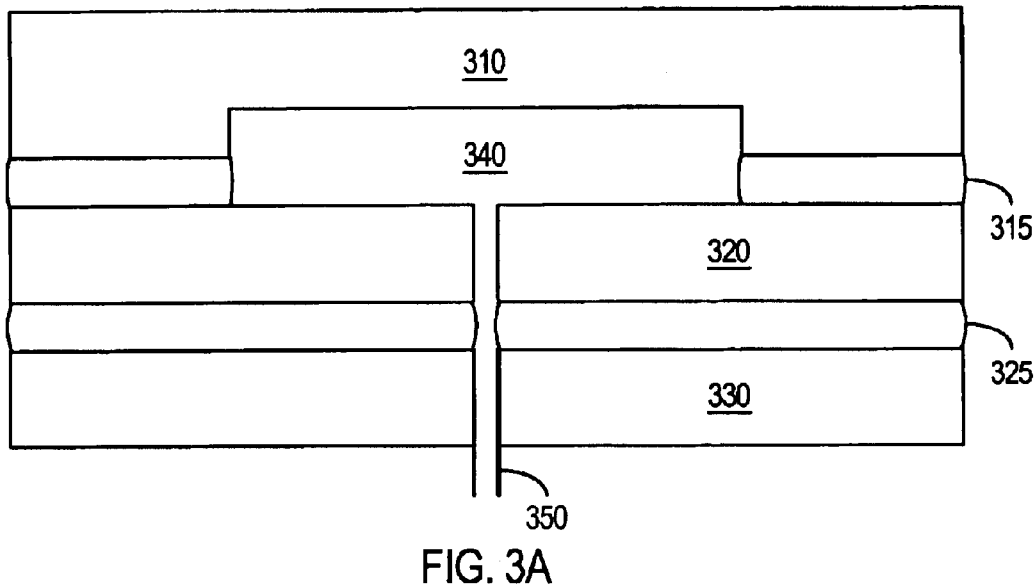
FIGS. 3A and 3B are cross-sectional views of assemblies including multiple solder joints in accordance with embodiments of the invention.

FIG. 3A illustrates another exemplary embodiment of the present invention where a soldered assembly 300 is part of an optical switch. Assembly 300 includes three components 310, 320, and 330 that are joined using two solder joints 315 and 325.

In the optical switch, upper component 310 is a quartz waveguide. In an exemplary embodiment of the invention, components 310 and 320 and solder joint 315 form a cavity 340 that measures about 18 mm in diameter by 5 μm deep. Optical switching in this device requires a fluid in cavity 340, and a pipe 350 to cavity 340 is used to fill cavity 340 with fluid after assembly of optical switch 300.

Component 320 is a silicon chip that locally heats the liquid in cavity 340 to create a gas bubble that redirects a selected light beam during optical switching. In an exemplary embodiment, the active area of silicon chip 320 is a roughly square and about 250 mm² in area.

Because silicon is intrinsically brittle and must otherwise have an attached pipe 350 for filling cavity 340, the third component 330 is a metal backing plate to which silicon chip 320 and pipe 350 are attached. Backing plate 330 supports and dissipates heat from silicon chip 320. In the exemplary embodiment of the invention, backing plate 330 is made of molybdenum to provide a reasonably good match between the coefficient of thermal expansion (CTE) of silicon chip 320 and the CTE of metal backing plate 330.

A variety of considerations dictate that solder joint 325 between silicon chip 320 and metal backing plate 330 must be thin, hermetic, and free of voids. In particular, since solder is generally a relatively poor heat conductor, solder joint 325 needs to be thin, typically thinner than 20 µm to conduct heat away from silicon chip 320. Additionally, solder joint 325 needs to be relatively free of voids to maximize adhesion between backing plate 330 and silicon chip 320 and to maximize the metal area for heat conduction. Solder joint 325 also needs to be hermetic to prevent the liquid in cavity 240 from leaking out between silicon chip 320 and metal backing plate 330. These requirements on solder joint 325 indicate the pressure variation process is desirable during joint formation.

The soldering process can exploit the presence of pipe 350 by using pipe 350 as a vent for cavity 340. In an exemplary embodiment, a solder such as an indium solder is pre-applied to a top surface of metal backing plate 330. Quartz waveguide 310, silicon chip 320, and metal backing plate 330 are then brought into contact inside a chamber. The chamber is evacuated to a pressure of about 10 mPa while the assembly is heated to a peak temperature of 175° C. At the peak temperature, the pressure in the chamber is raised to about 200 kPa, which is maintained for approximately 1 minute. The chamber and assembly cools while still maintaining the pressure of 200 kPa.

After completing assembly 300, cavity 340 is filled with liquid via pipe 350. Crimping then seals pipe 350, which is made of thin-wall nickel and pre-attached to metal backing plate 330 by high temperature brazing.

Figure 3B:
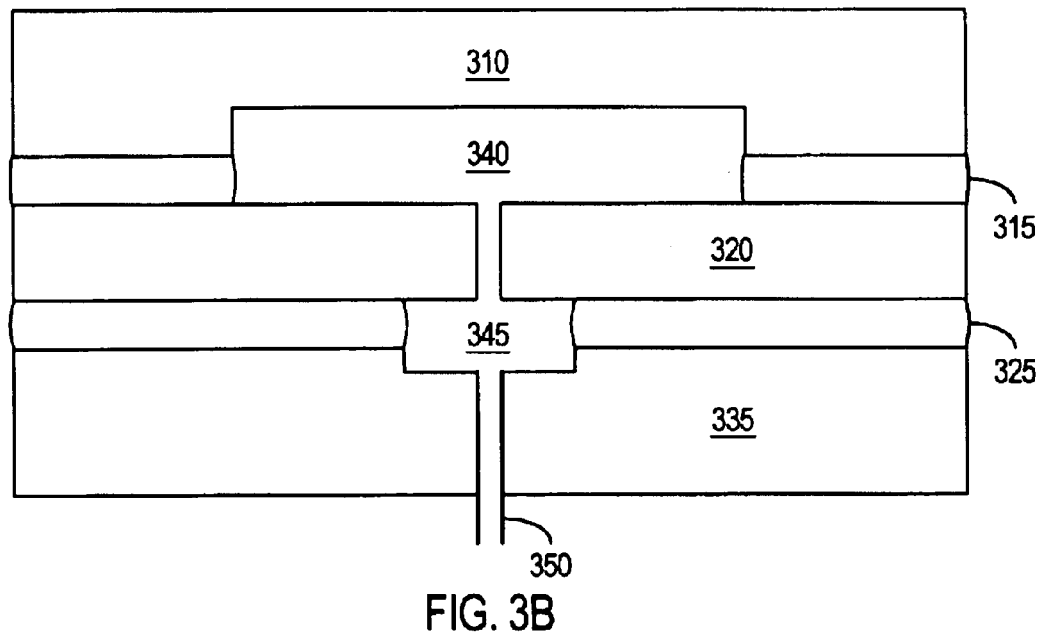

FIG. 3B shows an alternative embodiment of an optical switch assembly 305 that differs from optical switch assembly 300 of FIG. 3A primarily in the addition of a cavity 345 within solder joint 325 between silicon chip 320 and metal backing plate 335. As described above, cavity 345 improves the effectiveness of the pressure variation process on solder joint 325 and also enhances the likelihood of solder joint 325 being hermetic. The improved likelihood of successfully forming a hermetic solder joint 325 is believed to result from a second, interior solder fillet around the perimeter of cavity 345. In contrast, the exterior solder fillet around silicon chip 320 extends around a much larger perimeter, and the chance of a defect occurring along the larger perimeter is proportionally larger.

In an exemplary embodiment of invention, cavity 345 measures about 6.5 mm long by 1.25 mm wide by 2.8 mm deep. The openings in silicon chip 320 and metal backing plate 330 for venting and filling cavities 340 and 345 are about 1 mm in diameter.

Although the invention has been described with reference to particular embodiments, the description is only an example of the invention's application and should not be taken as a limitation. For example, although the above embodiments are primarily described as employing solder as a joining material between components, other joining materials such as brazes and some adhesives similarly suffer from trapped gas bubbles and would benefit from use of vented cavities as described above. Various other adaptations and combinations of features of the embodiments disclosed are within the scope of the invention as defined by the following claims.

What is claimed is:

1. A method for attaching components, comprising:
   forming an assembly including a first component and a second component with a joining material between the first and second components, the first and second components forming a cavity with a vent;
   heating the assembly to activate the joining material, wherein gas bubbles in the joining material during heating escape from the joining material via the cavity and the vent to surroundings of the assembly;
   after heating the assembly, increasing the surroundings from a first pressure to a second pressure that compresses gas bubbles that remain in the joining material;
   maintaining the second pressure while cooling assembly to solidify the joining material; and
   sealing the vent after the joining material solidifies, whereby the cavity becomes hermetically sealed.

2. The method of claim 1, wherein the joining material comprises solder.

3. The method of claim 1, wherein the joining material comprises a braze.

4. A method for attaching components, comprising:
   forming an assembly including a first component and a second component with a joining material between the first and second components, wherein the joining material comprises an adhesive, and the first and second components form a cavity with a vent; and
   heating the assembly to activate the joining material, wherein gas bubbles in the joining material during heating escape from the joining material via the cavity and the vent to surrounding of the assembly.

5. A structure comprising:
   a first component;
   a second component abutting the first component with the first and second components forming a cavity;
   a solder joint between the first and second components, wherein the solder joint surrounds the cavity formed between the first and second components; and
   a vent leading from the cavity, wherein the vent has a seal that is separate from the solder joint, and the solder joint and the seal hermetically seal the cavity.

6. The structure of claim 5, further comprising a series of components and solder joints forming a series of vented cavities.

7. The structure of claim 6, wherein the vent is in communication with each of the cavities.

8. The structure of claim 5, wherein one of the first and second components is silicon.

9. The structure of claim 5, wherein the first component comprises a plate of a material selected from the group consisting of a glass, a ceramic, a semiconductor, or a metal.

10. The structure of claim 5, wherein the joining material comprises an adhesive.

11. The structure of claim 5, wherein the joining material comprises a braze.

12. A structure comprising:
    a first component;
    a second component abutting the first component with the first and second components forming a cavity;

a joining material between the first and second components, wherein the joining material surrounds the cavity formed between the first and second components, wherein the cavity measures about 250 mm² in area and measures about 18 mm in diameter by 5 μm deep; and a vent leading from the cavity.

13. A structure comprising:

a first component;

a second component abutting the first component with the first and second components forming a cavity, wherein one of the first and second components is molybdenum, a joining material between the first and second components, wherein the joining material surrounds the cavity formed between the first and second components; and a vent leading from the cavity.

* * * * *